N. J. KINDEN.
LAWN MOWER.
APPLICATION FILED OCT. 9, 1916.

1,235,144. Patented July 31, 1917.

Witnesses:

Inventor
N. J. Kinden
By
Attorneys

UNITED STATES PATENT OFFICE.

NIKOLAI J. KINDEN, OF LAKE MILLS, IOWA.

LAWN-MOWER.

1,235,144. Specification of Letters Patent. Patented July 31, 1917.

Application filed October 9, 1916. Serial No. 124,577.

*To all whom it may concern:*

Be it known that I, NIKOLAI J. KINDEN, a citizen of the United States, residing at Lake Mills, in the county of Winnebago, State of Iowa, have invented certain new and useful Improvements in Lawn-Mowers; and I do hereby declare the following to be a full, clear, and exact description of the invention, such as will enable others skilled in the art to which it appertains to make and use the same.

The present invention is directed to improvements in lawn mowers, and more particularly to that type employing a reciprocating cutter bar.

The invention has for its object to provide a lawn mower constructed in such a manner that rotary movement from the running wheels will be converted into reciprocatory movement for operating the cutter bar.

A further object of the invention is to provide a lawn mower having an extremely simple arrangement of gears, shafts and links for actuating the cutter bar.

With these and other objects in view, this invention resides in the novel features of construction, formation, combination and arrangement of parts to be hereinafter more fully described, claimed and illustrated in the accompanying drawing, in which:—

Figure 1:
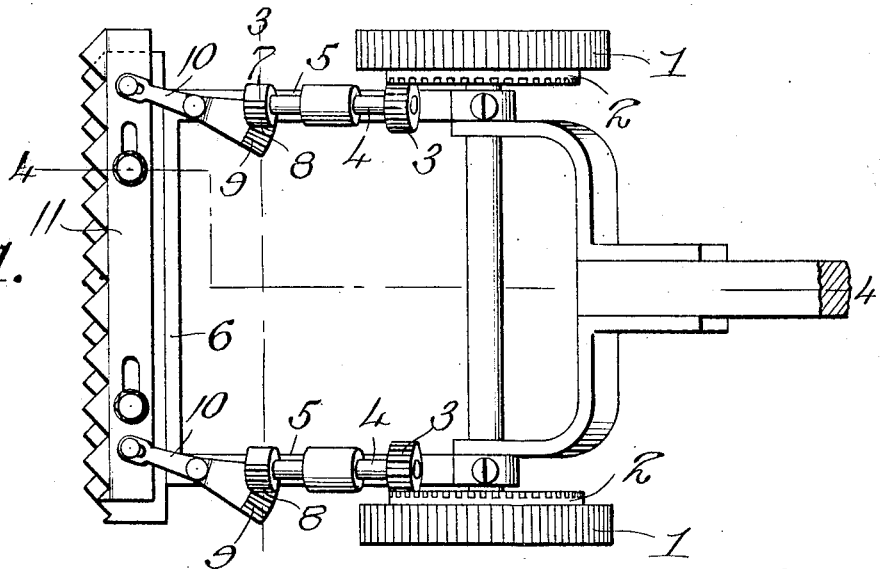
Figure 1 is a plan view of the device.
Figure 2:
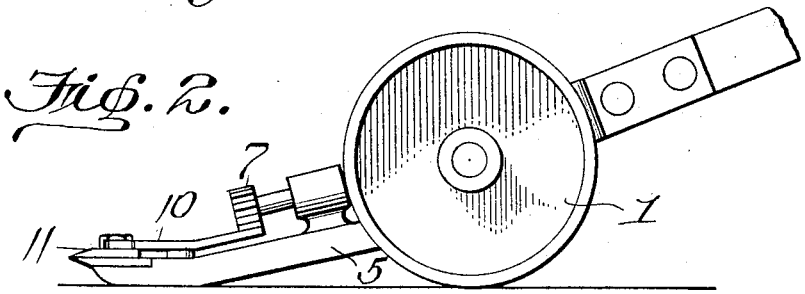
Fig. 2 is a side view.
Figure 3:
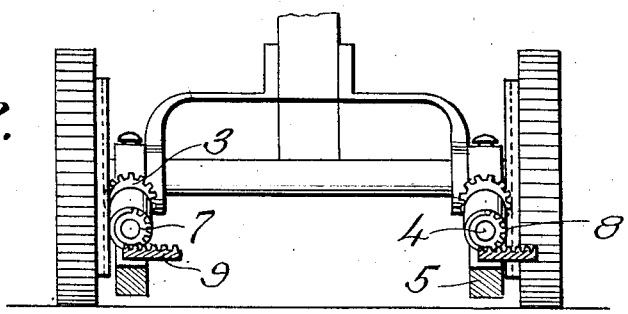
Fig. 3 is a sectional view on line 3—3 of Fig. 1.
Figure 4:
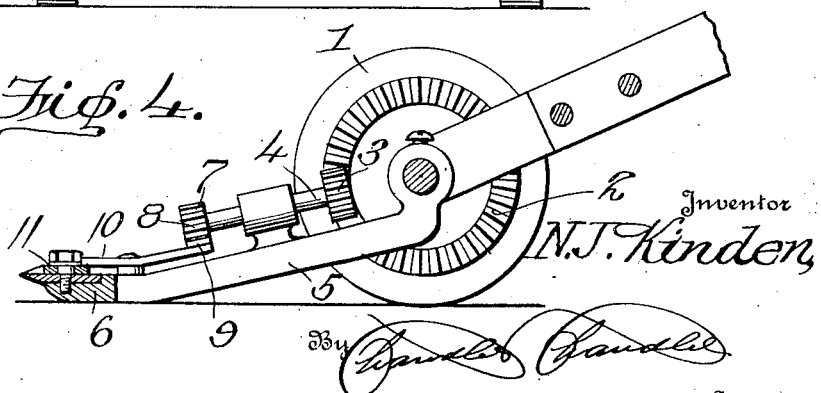
Fig. 4 is a similar view on line 4—4 of Fig. 1.

Referring to the drawing 1 indicates the running wheels which are provided with annular gears 2, said gears being adapted to mesh with the pinions 3. The pinions 3 are fixed to the rear ends of the shafts 4, said shafts being journaled on the side bars 5 of the frame 6.

Fixed to the outer ends of the shafts 4 are mutilated gears 7, the teeth 8 of which are adapted to alternately mesh with the racks 9 which are fixed to the ends of the levers 10, said levers being pivotally connected to the bars 5 of the frame 6. The outer ends of the levers are connected to the cutter bar 11 by pin and slot connections.

From the foregoing description it will be seen that when the machine is pushed across the lawn that the running wheels 1 will impart rotary movement of the shafts 4 and to the mutilated gears 7 which alternately engage the racks 9, thus causing the same to oscillate and thus reciprocate the cutter bar 11.

It is obvious that the cutter bar 11 can be removed when desired for sharpening the same, or substituting a new one should it become worn.

What is claimed is:—

In a lawn mower, the combination of a frame, running wheels supporting the frame, shafts supported by the frame and having pinions fixed to their inner ends, annular gears carried by the running wheels and meshing with the pinions, mutilated gears fixed to the forward ends of the shafts and having teeth thereon, levers pivotally connected intermediate their ends to the frame and adapted to alternately engage the teeth of the mutilated gears, and a cutter bar having pin and slot connections with the outer ends of the levers.

In testimony whereof, I affix my signature, in the presence of two witnesses.

NIKOLAI J. KINDEN.

Witnesses:
I. L. MOEN,
L. E. LUDWIG.

Copies of this patent may be obtained for five cents each, by addressing the "Commissioner of Patents, Washington, D. C."